United States Patent Office 3,408,264
Patented Oct. 29, 1968

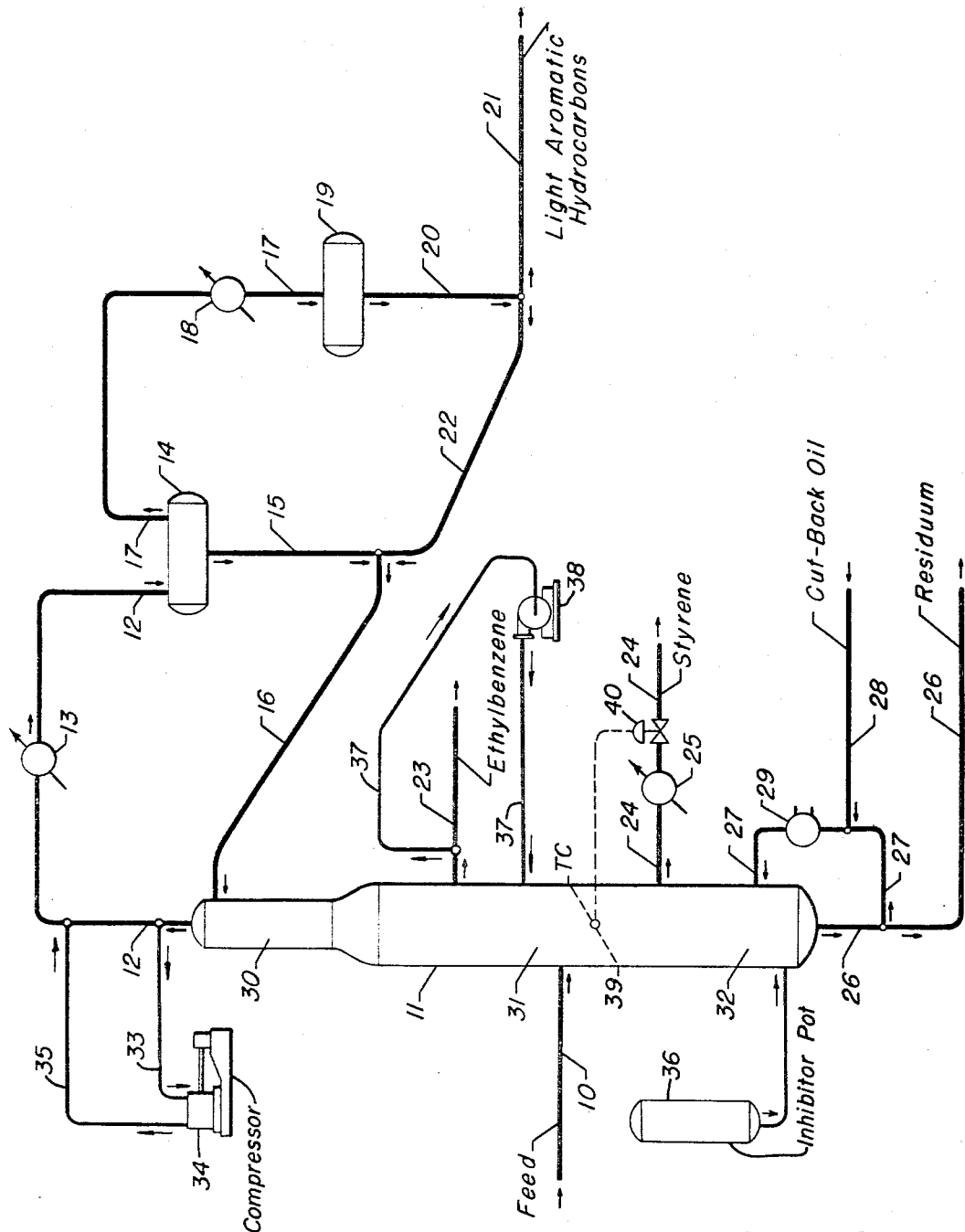

3,408,264
SUBATMOSPHERIC DISTILLATION OF A BENZENE, TOLUENE, ETHYL BENZENE, STYRENE MIXTURE IN A SINGLE COLUMN WITH A CUT-BACK OIL
Dennis J. Ward, Lombard, Ill., assignor to Universal Oil Products Company, Des Plaines, Ill., a corporation of Delaware
Filed Nov. 22, 1966, Ser. No. 596,145
8 Claims. (Cl. 203—2)

ABSTRACT OF THE DISCLOSURE

Method for distilling a mixture of benzene, toluene, ethylbenzene and styrene in a single distillation column having a column bottoms temperature exceeding 220° F. Styrene in a purity from 95% to 99% by weight is recovered as a side-cut fraction from the distillation column. Ethylbenzene is also a side-cut fraction with the benzene and toluene being removed as an overhead distillate fraction.

---

This invention relates to a fractionation scheme. It particularly relates to a distillation method for separating styrene from other close-boiling aromatic hydrocarbons. It specifically relates to a method for separating styrene from the normally liquid effluent from an ethylbenzene dehydrogenation reaction zone. It also relates to a distillation method for separating the components contained in a mixture comprising benzene, toluene, ethylbenzene and styrene.

It is known in the prior art that styrene can be recovered from the normally liquid effluent of an ethylbenzene dehydrogenation reaction zone by a complicated series of fractionation columns. It has been thought that the necessity for a large number of fractionation columns has been the difficulty of separating close-boiling components without causing the styrene to undergo heat polymerization. Consequently, the prior art uses a first fractionation tower to separate the benzene and toluene from the effluent mixture, then uses a large fractionation tower for separating the ethylbenzene from the styrene, and finally uses a recovery tower to recover styrene in high concentration. Typically, the ethylbenzene recovered is recycled to the dehydrogenation reaction zone for further conversion to styrene.

It is an object of this invention to provide a fractionation method.

It is another object of this invention to provide a method for separating styrene from the normally liquid effluent from an ethylbenzene dehydrogenation reaction zone by an improved distillation process.

It is a specific object of this invention to provide a method for recovering styrene in high concentration from a feed mixture comprising benzene, toluene, ethylbenzene, and styrene via a distillation method having improved economic aspects.

The invention may be fully understood by a description thereof presented hereinbelow with reference to the appended drawing which is a schematic representation of one embodiment of the invention.

According to the present invention, a method for separating styrene from the normally liquid effluent from an ethylbenzene dehydrogenation reaction zone comprises introducing said effluent into a single distillation column maintained under distillation conditions; withdrawing relatively light aromatic hydrocarbons as an overhead fraction; withdrawing relatively medium aromatic hydrocarbons as an upper side-cut fraction; withdrawing styrene as a lower side-cut vapor fraction; introducing relatively non-volatile hydrocarbons into said column; and, removing residuum including said non-volatile hydrocarbons from said column as a bottoms fraction.

Another embodiment of this invention includes processing a feed mixture comprising benzene, toluene, ethylbenzene, and styrene wherein the overhead fraction comprises benzene and toluene, the upper side-cut fraction comprises ethylbenzene, and the distillation conditions include a sub-atmospheric pressure within the column and a column bottoms temperatures exceeding 220° F.

A specific embodiment of this invention includes a method for recovering styrene in high concentration from a feed mixture comprising benzene, toluene, ethylbenzene, and styrene which comprises the steps of: (a) introducing said mixture at a temperature from 60° F. to 250° F. into a single distillation column having from 50 to 140 distillation trays therein; (b) withdrawing from said column an overhead stream comprising benzene and toluene at a temperature from 80° F. to 120° F. and a pressure from 50 to 150 mm. Hg absolute; (c) withdrawing from said column a side-cut fraction comprising ethylbenzene at a temperature from 140° F. to 180° F.; (d) withdrawing styrene as a side-cut vapor fraction at a rate responsive to a temperature in said column from 200° F. to 230° F.; (e) introducing a relatively heavy aromatic hydrocarbon stream into the bottom section of said column as cut-back oil; (f) withdrawing a bottoms fraction including at least part of said cut-back oil; and (g) reboiling a portion of said bottoms fraction to maintain a temperature in the bottoms section of said column from 230° F. to 270° F.

It is noted from the above description that the present invention is based upon the dscovery that the normally liquid components from an ethylbenzene dehydrogenation reaction zone can, in fact, be separated via a single distillation column. This improvement over the prior art effectuates considerable economies of operation not only in initial capital investment, but also in utility operating costs. It will be further noted from the detailed description provided herein that the styrene recovered from the single distillation column is in substantially pure form in that it is substantially free of ethylbenzene. In similar fashion, the method of the present invention provides for benzene and toluene to be recovered in high concentration. As will be evident from the description, the ethylbenzene stream recovered as a side-cut fraction need not be substantially pure in that it may contain significant amounts of toluene. However, no difficulties of operation are experienced since it was also discovered that the ethylbenzene containing significant quantities of toluene could satisfactorily be recycled in total to the ethylbenzene dehydrogenation reaction zone.

As previously indicated, the essence of the present invention is an improved distillation method. It is preferred, therefore, that the distillation trays placed in the single column of this invention, be of relatively low pressure drop per tray. That is, it is preferable that each tray contain no more than 4 mm. Hg absolute pressure drop, and typically should be in the range from 2 to 3 mm. Hg pressure drop. Although the benefits to be gained from the present invention are considerable, it is not clear upon what theory the present invention is based. It was surprising to find that the styrene within the single distillation column did not, in fact, undergo heat polymerization to any considerable extent. Therefore, the present invention provides for styrene purities of at least 95% by weight, and typically will produce styrene at greater than 99% by weight purity. In similar fashion, minimal amounts of styrene are lost through polymerization; that is, it was found that styrene could be recovered in amounts of at least 95% by weight of the styrene present in the incoming feed, and typically will exceed 98% by weight recovery. One reason for the success of the present invention could perhaps be the amount of residence time in the fractionation tower for the styrene. It was found that a minimum residence time was desirable, and that a residence time of from 2 minutes to 50 minutes would result in satisfactory operation of the single distillation tower. In addition, it may be preferable to exclude oxygen as a gas from the distillation tower although it is contemplated that styrene polymerization inhibitors would be used in which case a minimum amount of oxygen may be necessary for the effective operation of certain types of inhibitors.

As used herein, the various temperatures and pressures referred to as the overhead and bottoms is intended to include the conventional method of measuring the overhead temperature in that it is typically a measurement of the temperature in the overhead vapor line from the column. In similar fashion, the bottoms temperature is generally the temperature of the liquid being removed from the column in the bottom, although it is equally satisfactory to measure the bottoms temperature in the vapor line coming from the typical reboiler system used to supply the heat of fractionation. It should also be noted that the present invention is based upon, at least in part, the bottom temperature exceeding 220° F. Generally, no upper limit is necessary but it should be kept in mind that the upper limit, of course, is based upon the amount of polymerization which can be tolerated in the distillation system. When the invention discusses substantially "no polymerization," it of course must mean there is no significant polymerization which would tend to plug up heat exchange systems and transfer lines, pumps, and the like. It is recognized, of course, that the nature of styrene will cause some polymerization to take place.

The cut-back oil referred to hereinabove, can be any relatively heavy hydrocarbon material and typically may be a relatively aromatic hydrocarbon such as isopropylbenzene. It is contemplated by the present invention that the cut-back oil may be any relatively heavy oil. The purpose of the cut-back oil is to keep viscosity of the bottoms stream from exceeding pumpable limits. Surprisingly, it was found, however, that the presence of the cut-back oil had a beneficial effect of inhibiting the polymerization of styrene. The cut-back oil also provided a means for recovering the maximum amount of styrene from the feed material. As will be obvious from a description with reference to the appended drawing, the residuum which is removed from the bottom of the column contains substantially no styrene. Also, the control of the bottoms temperature is a means for maximizing the recovery of the styrene. If the bottoms temperature, of course, is allowed to decrease below a minimum specified level, it would cause a considerable loss of styrene as a product to the residual stream. Those skilled in the art with the teachings presented herein will know how to operate the single distillation column in order to maximize the production of high purity styrene.

The invention may be more fully understood with reference to the appended drawing whereby a feed material typically comprising a mixture of benzene, toluene, ethylbenzene, and styrene is passed into the system via line 10. Generally, this feed stream is at a temperature from 80° F. to 110° F. The feed mixture is then passed into single distillation column 11 having from 50 to 120 distillation trays therein, each tray having approximately 2 to 3 mm. Hg pressure drop per tray. In distillation tower 11 the separation of the various components takes place. In the upper portion of the tower designated by the numeral 30, the light aromatics, or benzene or toluene, are separated from the relatively heavier ethylbenzene and styrene. The light aromatic hydrocarbons are removed from distillation column 11 at a temperature from 80° F. to 120° F., typically 100° F., and a pressure from 20 to 200 mm. Hg absolute, typically 100 mm. Hg absolute, via line 12 and passed into condenser 13 wherein this overhead stream is partially condensed and the liquid resulting therefrom accumulated in settler 14.

The liquid material condensed and collected in separator 14 is withdrawn from collector 14 via line 15 and passed back into distillation column 11 via line 16 as reflux on the upper portion of distillation column 11. Typically, the material in line 16 is primarily toluene. The non-condensed material in line 12 is removed from settler 14 via line 17 and comprises primarily benzene with a small amount of toluene therein. This vapor stream is passed into surface condenser 18 operating under conditions to substantially completely condense the material. Condenser 18 may be refrigerated in order to reach the condensation point of the benzene and toluene typically contained therein. The liquid condensed is accumulated in settler 19 and withdrawn from the process via lines 20 and 21 as a light aromatic hydrocarbon product. It is to be noted that the material in line 21 is substantially free of ethylbenzene and may be used as further feed to an alkylation reaction zone for the production of additional ethylbenzene if desired. Also as needed, a minor amount of the material in line 21 may be diverted via line 22 and admixed with the material in line 16 for reflux on distillation column 11. This provides a means for maximizing control of the overhead system.

Ethylbenzene is withdrawn from distillation column 11 via line 23 and, typically, is withdrawn from column 11 at a temperature from 150° F. to 200° F. At the withdrawal point in distillation column 11 the pressure therein may be from 70 to 180 mm. Hg absolute. As previously mentioned, the ethylbenzene is not necessarily a pure ethylbenzene stream, but may contain significant quantities of toluene, e.g., 1 to 20% by weight toluene. The ethylbenzene plus toluene in line 23 may, if desired, be recycled to the ethylbenzene dehydrogenation zone for the production of additional styrene. Also, as needed, in the section of distillation column 11 designated by the numeral 31, there may be added a reflux stream which can be part of the ethylbenzene stream in line 23 being passed via line 37 through pump 38 back into column 11. The reflux stream has been previously cooled by means not shown prior to the introduction into distillation column 11. The location of the reflux stream is typically at a point below the ethylbenzene drawoff location and above the feed location. As has been presented hereinabove, the amount of vapors present in zone 30 is regulated by the amount of reflux which is returned to the top of this section 31.

One of the important features of the invention is the removal of the styrene product from the single distillation column 11. The styrene, according to this invention, is removed from distillation column 11 via line 24 as a vapor side-cut fraction. This vapor fraction is removed at a rate regulated by a temperature within the distillation column 11 ranging from 220° F. to 260° F. designated as TC 39 which activates control valve 40. The vapor fraction is subsequently passed into condenser 25 whereby styrene is condensed and removed from the process in high concentration and high purity. As previously mentioned, the recovery of the styrene is typically in excess of 95% by weight and the purity is typically greater than 98% by weight styrene. The withdrawal of the styrene as a vapor side-cut fraction minimizes the tendency for there to be tars and polymers present in the stream. These tars and polymers pass down through the distillation zone designated by the numeral 32 and removed from the process via line 26.

The material in line 26 is preferably passed via line 27, at least in part, into steam reboiler 29 for the generation of vapors back into the distillation column. Cut-back oil, as needed, is added via line 28, preferably at a point on the inlet side of reboiler 29. The usefulness of the cut-back oil is evidenced by the fact that the residuum stream may be continuously removed from the process, thereby minimizing the residence time in column 11 for any styrene present therein. In other words, the continual withdrawing of the residuum is an improvement over the prior art process which generally maintains a liquid level in the bottom of a styrene recovery column so that styrene may be boiled out until there is a hard gunky tar left in the bottom which is very difficult to handle. The cut-back oil not only aids in the supplying of heat to distillation column 11, but may be partially vaporized to give some stripping action of the styrene out of the bottoms so that it may be removed as a vapor stream via line 24. However, it is important to known that even through a small amount of vapors may be removed from the cut-back oil added via line 28, it is intended to define this material as being relatively non-volatile in that it is not contemplated that a significant amount of cut-back oil vapors would pass up the column to the vapor draw point for the styrene being removed via line 24.

Accordingly, it is noted from the above description of the drawing that benzene and toluene are recovered from the method of the present invention in substantially pure form, the styrene is recovered in substantially pure form, and the ethylbenzene is recovered in a form which can be entirely recycled to an ethylbenzene dehydrogenation reaction zone for further conversion to styrene. To further insure that a minimum amount of styrene is lost via the polymerization route, a conventional styrene polymerization inhibitor may be added to the method of the present invention by means well known to those skilled in the art such as through inhibitor pot 36. Typically, non-volatile sulfur is added to the system and such inhibitor is removed from the process along with the residuum via line 26 and is not found in the styrene product which has been removed as a vapor product thereby avoiding the necessity of having a styrene rerun column. If need be, another styrene polymerization inhibitor, such as tertiary butyl-catechol, may be added to the styrene in line 24 as it is being pumped to storage for additional processing, for example, polymerizing of the styrene to the well known plastic material used in the building trades.

It was noted from the description that condenser 18 preferably was refrigerated in order to condense the benzene. It is intended to be included in the practice of this invention for the overhead stream contained in line 12 to be compressed via line 33, compressor 34, and line 35 prior to partial condensing in condenser 13. The compressor may be a conventional vacuum pump which is useful in pulling a vacuum on the column as well as increasing the pressure for condensation in condensers 13 and 18. A pressure rise across the compressor 34 may range from 50 to 700 mm. Hg absolute, and typically the pressure on condenser 13 may be as high as 400 mm. Hg absolute for efficient condensation to take place therein.

The invention claimed:

1. Method for separating styrene from the normally liquid effluent of an ethylbenzene dehydrogenation reaction zone which comprises introducing said effluent comprising benzene, toluene, ethylbenzene, and styrene into a single distillation column maintained under distillation conditions including sub-atmospheric pressure and a column bottoms temperature exceeding 220° F.; withdrawing relatively light aromatic hydrocarbons comprising benzene and toluene as an overhead fraction; withdrawing relatively medium aromatic hydrocarbons comprising ethylbenzene as an upper side-cut fraction; withdrawing substantially pure styrene as a lower side-cut vapor fraction; introducing relatively non-volatile hydrocarbons into the low end of said column; and, removing residuum including said non-volatile hydrocarbons from said column as a bottoms fraction.

2. Method according to claim 1 wherein said distillation conditions include an overhead pressure from 50 to 150 mm. Hg absolute, an overhead temperature from 80° F. to 120° F., and a bottoms temperature from 220° F. to 290° F.

3. Method according to claim 1 wherein said vapor side-cut fraction is withdrawn at a temperature from 220° F. to 260° F.

4. Method according to claim 1 wherein said non-volatile hydrocarbon comprises relatively heavy aromatic hydrocarbons.

5. Method for recovering styrene in high concentration from a feed mixture comprising benzene, toluene, ethylbenzene, and styrene which comprises the steps of:
 (a) introducing said mixture at a temperature from 60° F. to 200° F. into a single distillation column having from 50 to 120 distillation trays therein;
 (b) withdrawing from said column an overhead stream comprising benzene and toluene at a temperature from 80° F. to 120° F. and a pressure from 20 to 200 mm. Hg absolute;
 (c) withdrawing from said column a side-cut fraction comprising ethylbenzene at a temperature from 150° F. to 200° F.;
 (d) withdrawing styrene as a side-cut vapor fraction at a rate responsive to a temperature in said column from 220° F. to 260° F.;
 (e) introducing a relatively heavy aromatic hydrocarbon stream into the bottom section of said column as cut-back oil;
 (f) withdrawing a bottoms fraction including at least part of said cut-back oil; and,
 (g) reboiling a portion of said bottoms fraction to maintain a temperature in the bottom section of said column from 220° F. to 290° F.

6. Method according to claim 5 wherein a portion of said overhead stream is condensed and returned to the column as reflux in the upper section of said column and a portion of said ethylbenzene fraction is returned to the column as reflux in an intermediate section of said column.

7. Method according to claim 5 wherein said portion of bottoms fraction is reboiled in the presence of relatively non-volatile styrene polymerization inhibitor.

8. Method according to claim 6 wherein said overhead stream is compressed prior to said condensation.

References Cited

UNITED STATES PATENTS

| | | | |
|---|---|---|---|
| 2,240,764 | 5/1941 | Dreisbach et al. | 203—9 |
| 2,411,106 | 11/1946 | Petry et al. | 260—669 |
| 2,534,870 | 12/1950 | Kraft | 203—94 |
| 2,556,030 | 6/1951 | Coulter et al. | 203—69 |
| 2,871,169 | 1/1959 | Martin | 203—99 |
| 3,209,044 | 9/1965 | Meek et al. | 260—669 |
| 3,230,155 | 1/1966 | Schurch | 203—96 |
| 3,331,753 | 7/1967 | Foester et al. | 203—2 |

WILBUR L. BASCOMB, JR., *Primary Examiner.*